United States Patent [19]

Richards et al.

[11] 4,313,919
[45] Feb. 2, 1982

[54] PROCESS FOR REMOVING FINE SOLIDS FROM PHOSPHORIC ACID BY VACUUM FILTRATION

[75] Inventors: Thomas E. Richards, Jennings; James P. Harvey; Michael A. Daigle, both of Lake City, all of Fla.

[73] Assignee: Occidental Chemical Company, Houston, Tex.

[21] Appl. No.: 169,078

[22] Filed: Jul. 15, 1980

[51] Int. Cl.³ .............................................. C01B 25/16
[52] U.S. Cl. ............................... 423/321 R; 423/319; 423/320
[58] Field of Search .............. 423/317, 318, 319, 320, 423/321 R, 321 S; 210/768, 772, 777, 402

[56] References Cited

U.S. PATENT DOCUMENTS

| | | | |
|---|---|---|---|
| 2,839,194 | 6/1958 | Lopker et al. | 210/402 |
| 2,937,069 | 5/1960 | Zoellner | 423/320 |
| 3,425,799 | 2/1969 | Hazen et al. | 423/320 |
| 3,468,423 | 9/1969 | Pechon | 210/402 |
| 3,715,191 | 2/1973 | Rushton et al. | 423/320 |
| 3,919,088 | 3/1975 | Doncer et al. | 210/402 |
| 4,110,422 | 8/1978 | Hill | 423/317 |
| 4,115,265 | 9/1978 | Otte et al. | 210/402 |
| 4,121,968 | 10/1978 | Wells | 210/402 |
| 4,136,199 | 1/1979 | Mills | 423/321 R |

Primary Examiner—O. R. Vertiz
Assistant Examiner—Gregory A. Heller
Attorney, Agent, or Firm—Barry A. Bisson; W. N. Patrick

[57] ABSTRACT

A process, for removing solid impurities from impure phosphoric acid containing solids, comprising:

(a) passing said acid at an elevated temperature through a filter cake of a phosphoric acid-resistant filter aid supported on a porous medium, thereby to cause at least a portion of said solid impurities of said acid to be filtered therefrom and to be retained by said filter cake;

(b) contacting at least a portion of said filter cake with a displacing liquid, maintained at a temperature and in an amount sufficient to cause at least a portion of the acid which remains in said filter cake to pass through said filter cake without fracturing said filter cake;

(c) collecting said filtered acid which passes through said filter cake; and (d) removing an impurity-containing portion of said filter cake after contact with said acid and displacing liquid, thereby to present a fresh surface for subsequent filtration.

10 Claims, 2 Drawing Figures

PROCESS FOR REMOVING FINE SOLIDS FROM PHOSPHORIC ACID BY VACUUM FILTRATION

CROSS REFERENCE TO RELATED CASES

This application is related to our application Ser. No. 153,880 filed May 28, 1980, titled "Improved Rotary Vacuum Precoat Filter" and to commonly-owned copending applications Ser. No. 827,741 filed by Smith et al, now U.S. Pat. No. 4,235,584, Ser. No. 863,085, filed Dec. 22, 1977 by Mills et al, now U.S. Pat. No. 4,171,342 Ser. No. 954,647 filed by Mills Oct. 25, 1978, now U.S. Pat. No. 4,243,643 Ser. No. 971,702 filed Dec. 21, 1978 by Mills et al, now abandoned. The entire disclosure of each of these applications is hereby incorporated herein.

BACKGROUND OF INVENTION

The invention is directed to an improvement in filtering hot, unsaturated, saturated or supersaturated slurry, using a rotary vacuum precoat filter, especially in filtering a phosphoric acid slurry formed during the manufacture of phosphoric acid and containing typically up to about 15%, more usual 3–6%, by weight of solids.

The invention involves a process for removing solid impurities from impure phosphoric acid containing solids and comprises:

passing said acid at an elevated temperature through a filter cake of a phosphoric acid-resistant filter aid supported on a porous medium, thereby to cause at least a portion of said solid impurities of said acid to be filtered therefrom and to be retained by said filter cake;

contacting at least a portion of said filter cake with a displacing liquid, maintained at a temperature and in an amount sufficient to cause at least a portion of the acid which remains in said filter cake to pass through said filter cake without fracturing said filter cake;

collecting said filtered acid which passes through said filter cake; and removing an impurity-containing portion of said filter cake after contact with said acid and displacing liquid, thereby to present a fresh surface for subsequent filtration.

The amount of the displacing fluid, its pressure, and the angle of the spray relative to the filter cake are preferably chosen so as to minimize penetration of the solid impurities from the surface of the filter and cake into the interior of the cake.

Phosphate rock is mined principally for conversion to phosphoric acid and thereafter to high phosphate fertilizer products. Mined phosphate rock, usually after beneficiation (e.g. clay and sand removal), is solubilized with phosphoric acid and reacted with sulfuric acid to produce phosphoric acid solution and insoluble calcium sulfate. Such a process is generally referred to in the industry as the wet process of phosphoric acid production. After separation from the bulk of the solid calcium sulfate, usually by filtration, the resultant crude phosphoric acid solution is further processed to produce fertilizer products.

The crude phosphoric acid includes substantial proportions of impurities, such as compounds of fluorine; calcium, determined as CaO; sodium, expressed analytically as $Na_2O$; silicates, expressed analytically as $SiO_2$; $SO_4$; iron, expressed analytically as $Fe_2O_3$; aluminum, expressed analytically as $Al_2O_3$; and magnesium, expressed analytically as MgO.

The relative proportions of impurities contained in the crude phosphoric acid are largely determined by the type of wet processing utilized to produce the crude phosphoric acid and the nature of the phosphate-bearing rock from which the crude phosphoric acid is produced. Sufficient proportions of the impurities remain in the acid even after initial aging and settling and after a substantial period of time, relatively fine solids precipitate and separate from the acid in the form of a sludge. It is usually commercially impractical to hold the crude phosphoric acid sufficiently long enough to allow the formation and separation of the sludge.

It has been found, as disclosed in the U.S. patent application Ser. No. 827,741, filed Aug. 25, 1977, now U.S. Pat. No. 4,235,584 of Smith, et al, that by preheating the acid, followed by vacuum filtration through a filter medium including a diatomite cake, sludge forming impurities can be removed in sufficient quantity to substantially eliminate the subsequent formation of sludge during shipping and handling of the phosphoric acid product.

Sludge forming impurities can be removed from phosphoric acid by the processes disclosed in U.S. Pat. No. 4,136,199, and Ser. No. 954,647, the entire disclosures of which are incorporated herein by this reference.

Preferably, the filtration of the crude phosphoric acid is conducted using a rotary vacuum precoat filter. Rotary vacuum precoat filters are well-known in the art.

U.S. Pat. No. 3,907,680 discloses a process for purifying a crude aqueous wet process produced phosphoric solution which includes passing the solution through a layer or bed of perlite (an alumino-silicate). The patent further teaches that this purification technique may be accomplished via a vacuum filter. The patent does not disclose the use of diatomaceous earth as the filter precoat or the use of a water spray to remove entrained phosphoric acid from the filter cake.

A Johns-Manville brochure discloses a rotary vacuum filter containing a (Celite) filter aid precoat. Celite is Johns-Manville's trademark for its diatomaceous silica products. Among the numerous applications listed in the back of the brochure for Celite filter aids is the treatment of phosphoric acids. The rotary vacuum precoat filter device pictured on page 17 of the brochure includes means for applying a wash liquid to the filter cake. However, the brochure does not disclose maintaining the temperature of the wash liquid at the same temperature as the filter cake to remove entrained phosphoric acid without fracturing the filter cake, nor is any distinction made between washing a desired solid product and selective displacement from an undesired solid filter cake of a desired liquid.

U.S. Pat. No. 3,200,105 discloses a method for removing catalyst from a polymer product by passing the product through a precoated filter. An organic solvent wash is used following filtration to remove entrained product from the filter precoat. However, the patent contains no disclosure of temperature control of the organic solvent.

Other patents of general relevance in teaching the use of diatomaceous precoats on rotary filters are U.S. Pat. Nos. 3,616,908, 3,520,410, 3,502,575, 3,080,971 and 2,403,021. Processes in which phosphoric acid is filtered to remove solids are found in U.S. Pat. Nos. 4,164,550, 4,110,420 and 3,528,771.

With the use of rotary vacuum precoat filters, as well as other types of precoat filters, some $P_2O_5$ values can be lost in the precoating of filter aid. That is, the precoat cake can entrap and retain $P_2O_5$ values in the interstices of the cake. It would be desirable to develop apparatus and a process for recovering such $P_2O_5$ values.

By phosphoric acid resistant filter aid, we mean that the filter aid does not significantly lose its ability to aid in filtering fine particles from phosphoric acid, although in many cases, the filter aid can be partially digested upon exposure to the phosphoric acid being filtered.

SUMMARY OF THE INVENTION

The invention relates to a process for removing solid impurities from aqueous phosphoric acid containing solids and comprises:
  passing said acid at an elevated temperature through a filter cake supported on a porous medium, thereby to cause at least a portion of said solid impurities in said acid to be filtered therefrom and to be retained by said filter cake along with some of the acid;
  contacting at least a portion of said filter cake with a displacing fluid, preferably a liquid, maintained at a temperature and in an amount sufficient to cause at least a portion of the acid retained in said filter cake to pass through said filter cake without fracturing said filter cake;
  collecting said filtered acid which passes through said filter cake; and
  removing an impurity-containing portion of said filter cake after contact with said acid and displacing liquid, thereby to present a fresh surface for subsequent filtration.

The amount of the displacing fluid, its pressure, and the angle of the spray relative to the filter cake are preferably chosen so as to minimize penetration of the solid impurities retained by the cake.

The invention involves the use of controlled amounts of fine water spray to replace phosphoric acid in the voids of a diatomaceous earth filter cake on pressure-type (e.g. vacuum) rotary filters used to separate impurities from wet process produced phosphoric acid. For example, by carefully maintaining the amount, temperature, pressure and direction of the water spray, phosphoric acid entrained in the diatomaceous earth is removed by the water without fracturing the filter cake. Generally, it is preferred to maintain the temperature of the spray at about the same temperature as the filter cake.

The prior art does not teach providing a spray of water at about the same temperature as the filter cake to replace phosphoric acid in the voids of the filter cake on a rotary vacuum filter used to separate impurities from wet process produced phosphoric acid.

The process herein provides an improvement in the use of a rotary vacuum precoat filter assembly for producing a filtered liquid from an incoming feed stream of a solids-containing slurry. The rotary vacuum precoat filter comprises a rotatable filter drum, a precoat of filter aid forming a filter cake on an outer surface of the drum and means for creating and maintaining a pressure differential across the filter cake of filter aid sufficient for drawing filtrate into the drum when the solids-containing slurry is applied to an outer surface of the filter cake.

The process is preferably practiced using an apparatus comprising a nozzle positioned for spraying a displacing liquid on the outer surface of the filter cake. Connected to the nozzle is a supply conduit for delivering the displacing liquid under pressure to the nozzle. Included along the supply conduit is a temperature control for regulating the temperature of the displacing liquid. The temperature of the displacing liquid is regulated for providing a spray of the displacing liquid at about the temperature of the filter cake. Such temperature regulation minimizes thermal shock to the precoat of filter aid forming the filter cake. Thermal shock of the filter cake is undesirable as it can decrease filtration efficiency and lead to cracking or channeling of the filter cake. The displacement liquid is sprayed from the nozzles and impinges on the filter cake. The displacement liquid which impinges upon the filter cake displaces additional filtrate entrapped in and retained by the filter cake.

Thermal shock is especially undesirable when it causes cake shrinkage. Accordingly, the displacing liquid can sometimes be regulated at a higher temperature than the filter cake but usually should not be regulated at a temperature substantially lower than that of the filter cake.

BRIEF DESCRIPTION OF THE DRAWINGS

The invention herein will be better understood with regard to the following detailed description and accompanying drawings wherein.

DETAILED DESCRIPTION

The preferred rotary vacuum precoat filter assembly for use in the process of the invention is herein described with regard to the accompanying drawings. Although the rotary vacuum precoat filter herein can have utility in other processes, for ease of describing and understanding its operation it will be described herein with regard to the separation of solids from a crude phosphoric acid stream.

Figure 1:
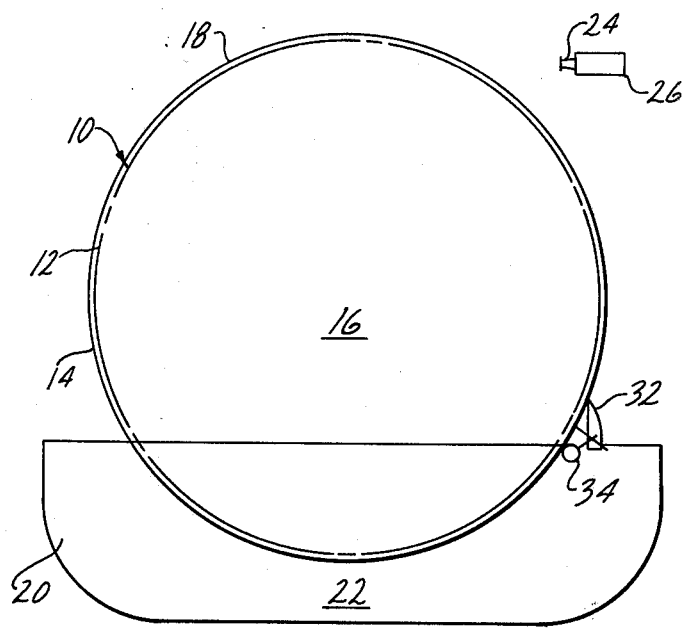
FIG. 1 is a plan view of an embodiment of the preferred apparatus for use in the process herein.
Figure 2:
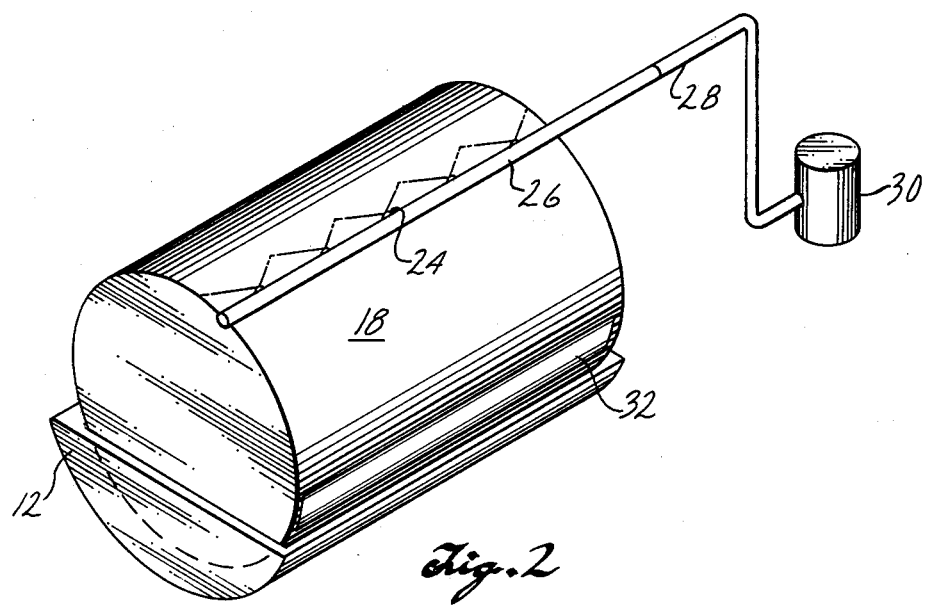
FIG. 2 is a top plan view of the apparatus of FIG. 1.

With reference to the drawings, the improved rotary vacuum precoat filter, shown in cross-section in FIG. 1, essentially comprises a cylindrical filter drum 12 supported in a filter bowl 20 in a manner which allows rotation of the drum about its own rotational axis (which is essentially in a horizontal plane). The ends of the drum are either open spiders or closed heads which carry the two main trunnions which support the drum.

The drum 12 has an outer surface 14 which is grid-like for permitting the flow of fluid therethrough. Within the drum is at least one compartment or cavity 16. Such a cavity 16 receives the liquid filtrate and contains elements for conveying such liquid filtrate out of the drum. In FIG. 1 the curved arrow shows the (clockwise) direction of rotation.

The outer surface 14 of the drum is covered with a filter cloth for preventing or at least inhibiting the passage of solids and filter aid through the outer surface and into the drum. Over the filter cloth is formed a filter cake 18. The filter cake is formed of a suitable filter aid such as diatomaceous earth, perlite, celluosic pulp, etc. The filter cake is built-up around the drum to a suitable depth for filtering the particular slurry being filtered. Generally, the filter cake is formed to a depth on the outer surface of the drum from about ½ inch to about 4 inches.

The filter cake is built-up on the drum by introducing a slurry of the filter aid in aqueous phosphoric acid to the filter tank 20. A reduced pressure is then created in the cavity 16 which draws the filter aid to the outer surface of the drum. The process is continued as the drum revolves about its axis to increase the depth of the filter aid coating.

The filter bowl 20 is positioned below and around the drum. The position of the drum in the tank is such that a lower portion of the drum is confined within the tank while an upper portion of the drum is exposed above the tank. The filter tank 20 serves as the reservoir which contains the slurry 22 to be filtered by the vacuum rotary precoat filter. Such a slurry is fed to the filter tank and from the tank is absorbed onto and through the filter cake.

Positioned above the drum is a nozzle 24 or plurality of nozzles 24. Preferably a plurality of nozzles is provided to provide a spray pattern which substantially uniformly covers the length of the drum. The nozzles 24 provide a spray of displacing fluid on the filter cake on the outer surface of the drum. When a plurality of nozzles are provided, the nozzles each provide a spray pattern 25 of the displacing liquid which meets each adjacent spray pattern as the spray impinges the filter cake. The spray patterns can overlap to a small extent but it is preferred that the spray patterns at least meet. If the spray patterns do not meet, then a portion of the filter cake may not be wetted with the displacing liquid.

Preferably, the nozzles 24 provide a spray pattern that is essentially fan-shaped rather than conical. Such a fan-shaped spray pattern 25 provides an essentially even coating of the displacing liquid along a line of impingement on the filter cake. Acceptable nozzles are available commercially such as the type H-U and type U series nozzles marketed by Spraying Systems Co., of Wheaton, Ill.

The nozzles are positioned such that the direction of spray is opposite the direction of revolving of the drum. In addition, the direction of spray is preferably along the surface of the filter cake, that is essentially tangential to the filter cake, rather than directed toward the filter cake. If the direction of spray were toward (e.g. normal to) the filter cake, the pressure of the spray could force small particles of sludge deep into the precoat and cause reduced filter rate. The spray could also disrupt the surface of the filter cake and possibly cause channeling if the spray were directed toward the filter cake.

The nozzles are supported on at least one header 26 which maintains the nozzles spaced from the drum and filter cake. The header 26 comprises a conduit for delivering displacement liquid to the nozzles. The header 26 can extend along the length of the drum when a plurality of nozzles are used. The header has a sufficient diameter for maintaining an essentially even pressure of displacing liquid feed for each of the nozzles to maintain substantially even and uniform spray patterns.

Connected to the header is a feed conduit 28 which supplies a feed of the displacing liquid to the header and nozzles. Along the feed conduit 28 is a fluid holding tank 30 equipped with a temperature regulator which can monitor and adjust the temperature of the displacing liquid. That is, the temperature regulator can raise or lower the temperature of the displacing liquid to avoid or inhibit thermal shock to the filter cake as the displacing liquid is sprayed onto the filter cake. The temperature regulator can be a heated reservoir or a steam sparge tank when it is desirable to raise the temperature of the displacing liquid.

Positioned along the surface of the drum is a knife 32 which provides a knife-edge or scraper for removing an outer portion of the filter cake as the drum revolves past the knife. The position of the knife is adjustable by the knife-adjuster 34. The knife can be adjusted to continuously remove an outer portion of the filter cake. That is, the depth of the filter cake can be decreased continually, such as from 4 inches to ½ inch, in increments as the drum revolves. By removing an outer portion of the filter cake a fresh surface of the filter cake is provided for receiving the slurry to be filtered. This removal is described in Ser. No. 827,741.

The apparatus herein has utility for filtering essentially any slurry wherein fine solids are suspended in liquid to separate the liquid from the solids. The apparatus is especially useful in the removal of solid impurities from a crude phosphoric acid stream. In such a process, the phosphoric acid produced by the reaction of phosphate rock, sulfuric acid, phosphoric acid (including recycle phosphoric acid) and calcium sulfate is a slurry. Such a slurry is generally filtered after it is removed from the reaction vessel to separate a crude phosphoric acid liquid stream from solids which essentially comprise calcium sulfate. The crude phosphoric acid is then concentrated by evaporation (e.g. to 46–50% $P_2O_5$) and transferred to an aging tank or settling tank wherein some solids that remain in the crude phosphoric acid can settle and be removed. These settled solids are typically very fine and difficult to separate by filtration.

As discussed above, such settling does not provide a commercially desirable method of removal of undesired fine solids (especially when low magnesium content acid is required). It has been found, especially with acid which has been treated with a calcium and fluoride containing solid as in U.S. Pat. No. 4,136,199, that a filtration of the crude phosphoric acid can remove impurities, in the form of solids present, to a commercially acceptable level.

In the filtration process, the crude phosphoric acid is heated to a temperature (if not already at such temperature) suitable for filtration. For phosphoric acid analyzing in the range of about 38 to about 58% $P_2O_5$, such a temperature is preferably between about 50° to about 77° C. (about 122° to about 170° F.) for greatest separation of solids and recovery of $P_2O_5$ values from diatomaceous earth. Higher temperatures can be used with Perlite (which is less susceptible to attack by HF in the hot, crude phosphoric acid).

Lower temperatures can be used for lower $P_2O_5$ analysis acids (e.g. about 26% $P_2O_5$ acid can be filtered at acceptable rates at temperatures as low as about 100° F., typically at about 120° F. or higher). The crude phosphoric acid is preferably filtered through a vacuum rotary precoat filter.

The vacuum rotary precoat filter is prepared for filtering the crude phosphoric acid by precoating the drum of the filter with a filter cake comprising a filter aid, such as diatomaceous earth, perlite and the like. The filter aid precoat is applied to the rotating drum by introducing a slurry of the filter aid in phosphoric acid (e.g. about 10 wt. % of diatomaceous earth) to the filter bowl. A preferred phosphoric acid for this slurry is the filtrate acid from the present process. As the drum revolves and a vacuum or reduced pressure is applied, the filter aid coats the outer surface of the drum. The filter aid is coated on the drum to a depth of about 2 to about 4 inches.

After the drum has been precoated, the crude phosphoric acid from the aging or settling tanks is introduced to the filter bowl 20. A reduced pressure is created and maintained with the drum 12 by means of a suitable vacuum pump. A pressure differential is thereby effectuated across the filter cake. This pressure differential causes a pick-up of the crude phosphoric acid onto the filter cake. For better utilization of filter aid, when the inventory in the bowl is about enough to complete the precoat, the feed of precoat slurry to the bowl can be stopped and the precoat filtrate (filtered phosphoric acid) recycled to deplete the filter aid.

The phosphoric acid present in the crude phosphoric acid is pulled through the filter cake into the interior cavity 16 of the drum as the filtrate. A substantial quantity of the impurities present in the crude phosphoric acid as solids is retained in the filter cake. For example, the impurities retained can include compounds, typically as solvated ions, of fluorine; calcium, usually analytically expressed as CaO; sodium, usually analytically expressed as $Na_2O$; silicon, usually on analytically expressed as $SiO_2$; iron, usually analytically expressed as $Fe_2O_3$; aluminum, usually analytically expressed as $Al_2O_3$; magnesium, usually analytically expressed as MgO, sulfur, usually as $SO_4^{-2}$, heavy metals, etc.

In general, for faster filtration rates, the acid should be filtered at the highest temperature attainable, but not so high as to produce appreciable attack of the filter aid.

In addition to retaining such impurities, there can be some $P_2O_5$ values entrapped within the interstices of the filter cake. By $P_2O_5$ values is meant compounds of phosphorus present in the crude phosphoric acid. Such entrapped $P_2O_5$ values have heretofore been lost in the filter cake as the filter cake is removed in increments by the advancing knife 32 or doctor blade. The knife is mounted on the apparatus for advancement in response to the rotation of the drum. As the drum rotates the knife advances toward the drum for controllably removing a portion of the filter cake. $P_2O_5$ values entrapped in the filter cake are removed along with the portion of the filter cake.

Some, usually a majority, typically 60 to 80% or more, of the soluble $P_2O_5$ values entrapped in the filter cake can be recovered by spraying a displacing liquid onto the filter cake 18 prior to removal of an outer portion of the filter cake by the knife 32. The displacing liquid can be water, or dilute acid (e.g. "pond water"), and is sprayed onto the filter cake from the sprayers 24. The sprayers were directed toward the filter cake, thus does not force fine solids through the filter cake and into the clarified acid product. To provide uniform coverage, the angle of spray can be adjusted by appropriate movement of the nozzles and header to maintain the direction of spray essentially tangential to the filter cake as the depth of the filter cake is reduced by the knife during rotation of the drum.

The nozzles, mounted on at least one header, are positioned spaced away from the drum and along its outer surface prior to the location of contact between the outer surface of the filter cake and the knife. The nozzles are preferably positioned for spraying the displacing liquid in a direction opposite the direction of rotation of the drum. By spraying in such a direction the displacing liquid can be in contact with the filter cake for a time sufficient to provide for displacing at least a majority of the water soluble $P_2O_5$ values entrapped in the filter cake. Note that water insoluble $P_2O_5$ can be contained in the fine solids being filtered.

The spray pattern 25 of the sprayers impinges the filter cake for covering the surface of the filter cake. Preferably, each sprayer provides a fan-shaped spray which extends to each adjacent spray pattern at the location of impingement on the filter cake. If the spray pattern did not meet, then a portion of the filter cake would not be contacted with the displacing liquid so as to displace $P_2O_5$ values in such portion. In addition, it is undesirable that there by any appreciable overlapping of the spray patterns. If there is substantial overlap between spray patterns, the displacing liquid in such areas of overlap can displace other displacing liquid into the cavity of the drum, which can dilute the filtrate (phosphoric acid) recovered and is an inefficient utilization of the displacing liquid.

Dilution of the phosphoric acid is also a factor in determining the flow rate of displacing liquid through the header and nozzles. The usual maximum permissible dilution of the recovered phosphoric acid filtrate is the amount of dilution that can be commercially acceptable. That is, if too great a dilution results, then an expense is encountered to reconstitute the phosphoric acid, as by evaporating the diluent. If sufficient BTU's are available for economic evaporation of the diluent, then a greater dilution can be tolerated for the amount of $P_2O_5$ recovered from the filter cake. The value of the recoverable and recovered $P_2O_5$ is also a consideration. For many phosphoric acid processes an acceptable dilution is about four percent, more preferred two percent or less, dilution of the filtered liquid phosphoric acid product (e.g., a two percent dilution of a 50% $P_2O_5$ analysis acid would result in a 49% $P_2O_5$ analysis acid).

A method to calculate the amount of displacing liquid to spray on the filter cake is to determine the volume of filter cake removed by the knife in gallons per minute. This value is then adjusted to determine the volume or percent that is liquid. The determined results provides a value for the displacement liquid that would theoretically displace 100% of the water soluble $P_2O_5$ in the filter cake. This value can be reduced or enlarged to provide the flow rate of displacement liquid for the desired recovery of $P_2O_5$ values. These numbers can vary with the drum rotation speed and adjustment of the knife. For a drum about 10 feet in diameter and about 12 feet long and a rotation speed of about one rotation per minute, it has been found that for a crude acid feed of about 30 to 60 gpm a preferred flowrate of displacing liquid is about 3 to about 6 gallons per minute to recover about 75% of the $P_2O_5$ in the voids of diatomaceous earth filter cake when filtering a crude acid containing about 45 to 50% $P_2O_5$ (at about 150° to about 170° F.).

A second header with additional sprayer nozzles can be used in the vacuum rotary precoat filter herein. Such a second header and nozzles provides a second spray of displacing liquid which can displace additional $P_2O_5$ values in the filter cake that were not displaced by the first spray of displacing fluid.

Generally, the crude phosphoric acid is filtered at temperatures greater than ambient, such as about 120° to about 170° F. (about 50° to about 77° C.), more preferred about 130° to about 150° F. (about 54° to about 66° C.). Temperatures greater than about 170° F. are undesirable when diatomaceous earth is the filter aid, as fluorine compounds present in the crude phosphoric acid can attack the diatomaceous earth. Because of the temperature of the phosphoric acid and filter cake, it has been found herein that the displacing liquid should preferably be heated to a temperature substantially equivalent to the temperature of the filter cake. The temperature differential between the spray of displacement liquid and filter cake is preferably no greater than about 15° C. and, more preferably, is no greater than about 5° C. When the temperature of the displacement liquid and filter cake are essentially the same, there is little thermal shock to the filter cake. Thermal shock can arise if the temperature differential is greater than 15° C. Thermal shock can cause cracking of the filter cake and otherwise also be deleterious to the filtration process. The displacement liquid can be heated by a suitable temperature regulator in the holding tank 30, such as a steam sparger, preferably by automated instrumentation.

The process and apparatus described above are also useful for removing finely divided solids from the aqueous phosphoric acids, such as those obtained by dissolving oxidized phosphorous in water or dilute phosphoric acid.

ILLUSTRATIVE EXAMPLES

The following examples illustrate embodiments of the process and apparatus for recovery of phosphoric acid values from a crude wet process phosphoric acid stream which has been treated with a precipitant comprised of compounds of calcium and fluorine as in U.S. Pat. No. 4,136,199 and Ser. No. 954,647.

EXAMPLES 1-5

Five experiments were conducted using varying arrangements of spray nozzles having differing spray characteristics. The nozzles were placed on a header spaced from the drum of a Dorr-Oliver 10 ft. diameter×12 ft. long precoat filter. A crude wet process phosphoric acid stream at a temperature between about 130° to about 150° F. was filtered. A filter aid of diatomaceous earth was initially precoated on the drum to a depth of about four inches in each example.

In Example 1, a single header was utilized having five 65° nozzles each having an orifice of 0.093 inch. The flow rate of the water (displacing liquid) was at a rate of about 5 gallons per minute (gpm). The nozzles were standard nozzles.

In Example 2, a single header was provided having 2 Spraco 43072504 nozzles. The nozzles provided a spray pattern of 120° and an orifice of 0.118 inch. The nozzles provided an even flow of spray, i.e., a substantially even distribution of the water throughout the spray pattern. The flow rate of the water was at a total of 4.8 gpm.

In Example 3, a double header having 2 Spraco 43072504 nozzles providing a spray pattern over 120° per header was used. The nozzles had an orifice of 0.118 inch. The total flow rate of water was 2.5 gpm.

In Example 4, a single header was provided having five Spraco 23181704 nozzles. The nozzles have an orifice of 0.076 inch and provide a spray pattern of 80° in a standard pattern. The total water flow rate was 2.5 gpm.

In Example 5, a single header was utilized having five Spraco 23181704 nozzles. Each of the nozzles has an orifice of 0.076 inch and provides a spray pattern of 80° and a standard flow pattern. The total water flow was at a rate of 5 gpm.

The results of the filtration tests conducted in each of the examples are given in the following table. With regard to Example 1, approximately ¾ of the $P_2O_5$ values present in the filter cake were recovered from the filter cake and included in the liquid phosphoric acid product. In the following table the feed stream of crude phosphoric acid is listed. The composition of the liquid product (phosphoric acid) is also listed as well as the analysis of the filter cake.

The table shows that $P_2O_5$ values can be recovered, and for Examples 2, 4 and 5 averaged, with $P_2O_5$ values lost to the filter cake being reduced to an average of only about 2.5%. The tests also show that the Example 2 nozzle is a preferred configuration.

Unless otherwise indicated herein, all percentages are by weight. As used herein, the term "substantially solids free" means that the filtrate contains less than about 1% solids (typically less than 0.5%).

In the above examples, a layer of the initially 4 inch thick filter cake is continuously removed by the doctor blade until the cake reaches about ½" in thickness, at which point the filtration of crude acid is stopped, the remainder of the cake is removed (e.g. by breaking the vacuum, then slowly rotating the filter) diatomaceous earth is applied.

In these examples no provision was made for adjusting the angle of the spray as the filter cake thickness changed. The angle chosen was such that a uniform spray without substantial overlap was obtained when the cake was about 2" thick. Therefore, at greater thickness there was a slight area between sprays where there was no overlapping of sprays and at thickness less than about 2" there was a slight overlapping. Better results than in these examples can be obtained by appropriate continuous adjustment of the spray angle and/or pattern.

In the above examples, the crude, concentrated, phosphoric acid had been treated with a calcium and fluoride containing solids in accordance with the teachings of U.S. Pat. No. 4,136,199 and a continuation in part application, Ser. No. 954,647, filed Oct. 25, 1978, the entire disclosure of said patent and application being incorporated herein by reference. The present invention is especially useful for filtered hemihydrate process acid, especially after concentration by evaporation, which has been treated in accordance with the teachings of said application and patent. The preferred hemihydrate processes include those of U.S. Pat. Nos. 4,132,760; 4,140,748; and 4,196,172.

These examples were run with relatively high solids content acid. Better results are usually obtained at lower solids content (e.g. 3-6% by weight).

The process and apparatus described herein are also useful for removing finely divided solids from aqueous fertilizer solutions and suspensions.

TABLE

| | | Ex. 2 | Ex. 3 | Ex. 4 | Ex. 5 |
|---|---|---|---|---|---|
| Feed | Wt. % MgO | .57 | .55 | .57 | .65 |
| | Wt. % $P_2O_5$ | 42.05 | 41.39 | 42.05 | 42.86 |
| | Wt. % $Al_2O_3$ | 1.35 | 1.35 | 1.35 | 1.51 |
| | Wt. % $Fe_2O_3$ | 1.0 | 1.02 | 1.0 | 1.07 |
| | Wt. % Solids | 11.28 | 12.09 | 11.28 | 9.69 |
| Product Avg. | $P_2O_5$ | 43.76 | 44.87 | 45.26 | 44.06 |
| | Wt. % MgO | .18 | .20 | .17 | .19 |
| | Wt. % $Fe_2O_3$ | 1.08 | 1.09 | 1.13 | 1.09 |
| | Wt. % $Al_2O_3$ | .92 | .94 | .93 | .95 |
| | Wt. % Solids | .45 | .28 | .50 | .32 |
| | *SpG | 1.508 | 1.530 | 1.526 | 1.558 |
| Cake Avg. | $P_2O_5$ | 6.82 | 12.65 | 8.10 | 7.92 |

TABLE-continued

|  | Ex. 2 | Ex. 3 | Ex. 4 | Ex. 5 |
|---|---|---|---|---|
| Wt. % MgO | 4.22 | 3.31 | 4.47 | 4.02 |
| Wt. % Fe$_2$O$_3$ | .18 | .44 | .28 | .30 |
| Wt. % Al$_2$O$_3$ | 6.84 | 4.41 | 5.56 | 5.13 |
| Wt. % Solids | 71.58 | 63.96 | 68.04 | 65.46 |
| Total Product (gal.) integrator | 5620 | 11,200 | 6,400 | 11,400 |
| Avg. Flow (gpm) integrator | 20.8 | 31.1 | 21.3 | 63 |
| Product P$_2$O$_5$ (tons) | 24.24 | 8.36 | 23.07 | 8.38 |
| Cake P$_2$O$_5$ (tons) | .1878 | 1.56 | .647 | .347 |
| Percent of Feed P$_2$O$_5$ to Cake | .77% | 15.7% | 2.73% | 3.98% |

*SpG = Specific Gravity.

What is claimed is:

1. A process for removing solid impurities contained in aqueous phosphoric acid comprising:
   (a) passing said aqueous phosphoric acid containing solid impurities at an elevated temperature through a filter cake of a phosphoric acid-resistant filter aid supported on a porous medium, thereby to cause at least a portion of said solid impurities in said aqueous phosphoric acid to be removed therefrom and to be retained by said filter cake and wherein a portion of said aqueous phosphoric acid is retained in said filter cake;
   (b) contacting at least a portion of said filter cake with finely divided droplets of a liquid, in an amount sufficient to cause at least a portion of said aqueous phosphoric acid which is retained in said filter cake to pass through to produce a filtrate comprising filtered, aqueous phosphoric acid, said liquid being maintained at a temperature such as to minimize fracturing of said filter cake;
   (c) collecting said filtrate; and
   (d) removing an impurity-containing first portion of said filter cake after contact with said aqueous phosphoric acid containing solid impurities and said liquid, and leaving a second portion of said filter cake containing a lesser amount of impurities than said first portion for subsequent use in the removal of solid impurities from phosphoric acid containing solid impurities.

2. The process of claim 1 wherein said filter cake comprises diatomaceous earth.

3. The process of claim 2 wherein said elevated temperature in Step (a) is in the range of about 50° to about 77° C.

4. The process of claim 1 wherein said liquid comprises water or a more dilute phosphoric acid than said filtrate.

5. The process of claim 1 wherein said aqueous phosphoric acid which is passed through said filter cake was manufactured by the wet process.

6. The process of claim 1 wherein said aqueous phosphoric acid which is passed through said filter cake was manufactured by dissolving an oxide of phosphorus in water or in dilute phosphoric acid.

7. The process of claim 1 wherein said filter cake comprises perlite.

8. The process of claim 1 wherein at least some of said solid impurities comprise a precipitate obtained from impure aqueous phosphoric acid by means of an added precipitant comprising compounds of calcium and fluorine.

9. A process for removing solid impurities contained in aqueous wet process phosphoric acid analyzing in the range of about 38-58% P$_2$O$_5$, said process comprising:
   (a) passing said aqueous wet process phosphoric acid containing solid impurities, at an elevated temperature in the range of from about 50° to about 77° C., through a filter cake of a phosphoric acid-resistant filter aid comprising diatomaceous earth or perlite supported on a porous medium, thereby to cause at least a portion of said solid impurities in said aqueous wet process phosphoric acid to be removed therefrom and to be retained by said filter cake and wherein a portion of said aqueous wet process phosphoric acid is retained in said filter cake;
   (b) contacting at least a portion of said filter cake with finely divided droplets of a liquid comprising water or a dilute phosphoric acid, in an amount sufficient to cause at least a portion of said aqueous wet process phosphoric acid which is retained in said filter cake to pass through to produce a filtrate comprising filtered, aqueous wet process phosphoric acid, said water or said dilute phosphoric acid being maintained at a temperature within a range of about 15° C. higher or lower than said elevated temperature in step (a) of said aqueous wet process phosphoric acid containing solid impurities so as to minimize fracturing of said filter cake, and wherein said dilute phosphoric acid is more dilute than said filtrate;
   (c) collecting said filtrate; and
   (d) removing an impurity-containing first portion of said filter cake after contact with said aqueous phosphoric acid containing solid impurities and said liquid, and leaving a second portion of said filter cake containing a lesser amount of impurities than said first portion for subsequent use in the removal of solid impurities from phosphoric acid containing solid impurities.

10. The process of claim 3 wherein said liquid is maintained at a temperature within a range of about 15° C. higher or lower than said elevated temperature in step (a) of said aqueous phosphoric acid containing solid impurities.